United States Patent [19]

White

[11] 4,395,747
[45] Jul. 26, 1983

[54] LOW INDUCTANCE ELECTROLYTIC CAPACITOR

[75] Inventor: Jack D. White, Clinton, Tenn.

[73] Assignee: Sprague Electric Company, North Adams, Mass.

[21] Appl. No.: 258,709

[22] Filed: Apr. 29, 1981

[51] Int. Cl.³ .................... H01G 9/00; H01G 1/06; H01G 4/06

[52] U.S. Cl. ................................ 361/433; 361/272; 361/311

[58] Field of Search .............. 361/271, 272, 273, 301, 361/303, 306, 308, 311, 433

[56] References Cited

U.S. PATENT DOCUMENTS 3,024,394  3/1962  Salisbury .................... 361/433
3,654,524  4/1972  Puppolo et al. ............... 361/433

FOREIGN PATENT DOCUMENTS 992625  7/1976  Canada .

*Primary Examiner*—Andrew J. James
*Assistant Examiner*—Seth M. Nehrbass

[57] ABSTRACT

A low inductance electrolytic capacitor utilizes a stripline on which the capacitor section is wound in extended foil fashion. Each piece of the metal stripline has a projection spaced from one end. The pieces are assembled with an insulating strip between them with the projections at opposite ends and opposite sides of the stripline. The foil extensions are welded directly to the stripline and the stripline to the capacitor terminals.

4 Claims, 3 Drawing Figures

LOW INDUCTANCE ELECTROLYTIC CAPACITOR

BACKGROUND OF THE INVENTION

This invention relates to a low inductance electrolytic capacitor in which the capacitor section is wound on a stripline and particularly to small size capacitors.

In the past, low-inductance, low equivalent series resistance (ESR) capacitors have been made utilizing striplines but the wound sections have been wound and flattened and attached to the stripline which is in turn connected to the capacitor terminals. When small size capacitors, e.g., two-inch diameter or less, are made in this manner, manufacturing costs are high as the labor costs remain approximately the same regardless of capacitor size.

SUMMARY OF THE INVENTION

This invention features a low inductance electrolytic capacitor in which the capacitor section is directly wound on a stripline in extended foil fashion.

By winding the foil section directly onto the stripline, some manufacturing steps of prior art stripline capacitors can be eliminated such as the separate winding and flattening of the foil sections before attachment to the stripline. The elimination of such steps for small size capacitors results in a much more cost-effective capacitor.

Briefly, the capacitor is wound in extended foil fashion around the preassembled stripline. The extended edges of the anode foil are crushed and welded to one side of the stripline, and the extended edges of the cathode foil are crushed welded to the other side of the stripline. The stripline is connected to terminals in a cover, the unit is inserted into a housing and impregnated with electrolyte, and the cover is sealed to the housing.

The crushing and welding of the extended foils to each other and to the stripline contribute to the low-ESR of the unit as foil resistance is decreased. The low-inductance is obtained by eliminating electrode tabs and welding the capacitor terminals directly to the stripline thereby decreasing the distance between foil termination and terminal connections.

DESCRIPTION OF THE PREFERRED EMBODIMENTS

Figure 1:
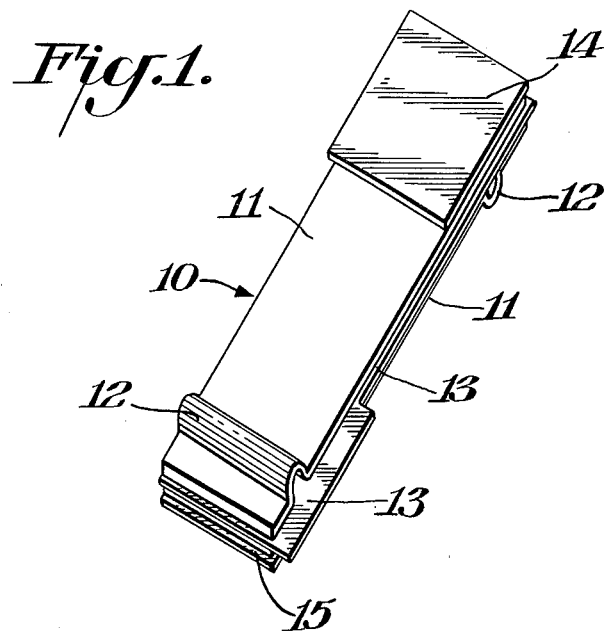
FIG. 1 is an oblique view of the assembled stripline.
Figure 2:
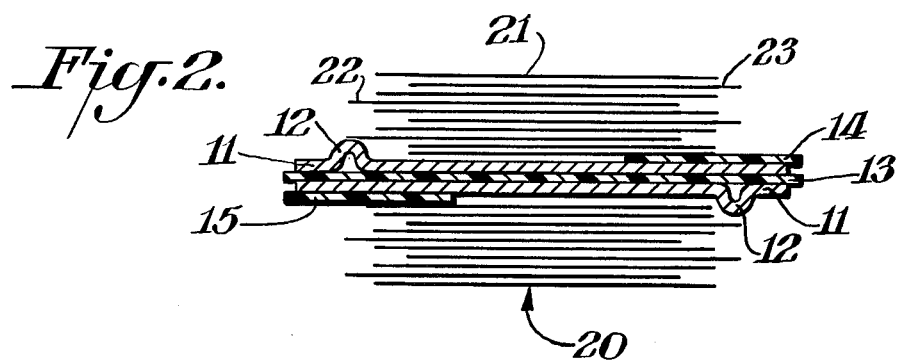
FIG. 2 is a side view of capacitor section rolled on the stripline.

The low inductance electrolytic capacitor of this invention is produced by pre-assembling the rectangular stripline 10 as shown in FIG. 1. Two identical metal members 11 that have a raised projection 12 spaced from one end are placed in opposition to each other with projection 12 extending outwardly and with an insulating plastic, preferably Mylar, strip 13 between them. Strip 13 has tabs 14 and 15 extending laterally from each end of strip 13, one from each side. As shown in FIG. 1, tab 14 is laterally folded around the upper metal member 11 and tab 15 laterally folded around the lower metal member 11, insulating an end of each metal member. The stripline assembly 10 is laminated together and is ready for use.

Stripline 10 is then used as a mandrel and capacitor section 20 is wound on it in extended foil fashion with interleaved spacers 21, between projections 12 with the edges of the extended foils lying over the projections. Anode foil 22 extends at one end of section 20 and cathode foil 23 extends at the other end of section 20.

Figure 3:
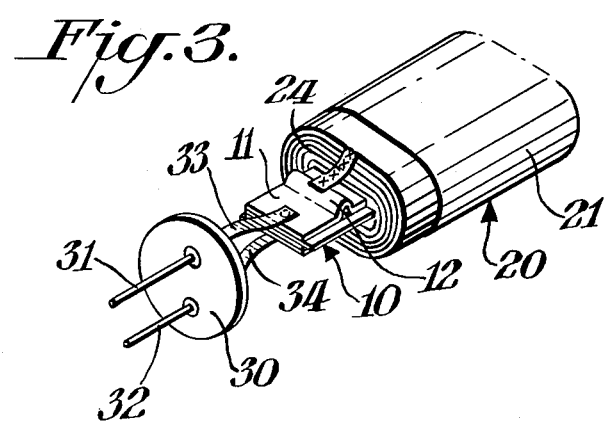
FIG. 3 shows the connection of the capacitor section to the terminals and cover.

The foil extensions are crushed and welded to projections 12 of stripline 10 as shown in FIG. 3 at weld zone 24. Anode foil is crushed and welded to one projection, and cathode foil crushed and welded to the other. Preferably, Tungsten Inert Gas (TIG) welding is used. Terminals 31 and 32 in cover 30 are connected to the upper and lower surfaces of stripline 10, preferably by TIG welding, shown exaggerated as flattened portions at 33 and 34, to stripline 10. In practice, the foils extend over the projections 12 and welded thereto as at 24 but are insulated from the opposing stripline by the insulating tab. The cover and terminals are as close to the end of stripline 10 as possible to give low inductance but are shown spaced apart for clarity. Cover 30 is a molded insulating cover.

The final assembly of the capacitor in the housing, impregnation with electrolyte, and sealing of the cover to the housing is done in a known manner and is not shown.

The electrode foils and the stripline metal members are preferably made of aluminum. The construction described above reduces both foil and terminal resistances as there are no intermediate tab, etc., connectors resulting in low inductance and low ESR, by the welding of the foil directly to the stripline and the stripline directly to the terminals.

What is claimed is:

1. A low inductance electrolytic capacitor comprising a pair of rectangular metal strips each having a raised projection spaced from one end thereof, a plastic insulating strip having a first tab extending laterally from one end thereof and a second lateral tab extending from the other end of said strip and in opposition to said first tab, said insulating strip being sandwiched between said metal strips with one tab being folded over one end of one of said metal strip and said second tab being folded over an end of said second metal strip, said metal strips being positioned so that one of said projections lies at one end of the resulting assembly and the other of said projections lies at the other end of said assembly, said metal strips and said barrier strip being laminated together forming a stripline, an anode foil and a cathode foil wound with interleaved spacer material in extended foil fashion directly around said stripline, said extended anode foil being crushed and welded to one of said projections, said extended cathode foil being welded to the other of said projections, a cover bearing two terminals one of which is electrically connected to one of said metal strips forming said stripline and the other of which is electrically connected to the other of said metal strips, and a housing in which said capacitor section is located and to which said cover is sealed.

2. A capacitor according to claim 1 wherein said capacitor section is impregnated with electrolyte.

3. A capacitor according to claim 1 wherein said wound cathode foil and said anode foil are located between said projections.

4. A capacitor according to claim 1 wherein said metal strips and said foils are aluminum.

* * * * *